United States Patent
Shih et al.

(10) Patent No.: US 12,316,798 B2
(45) Date of Patent: May 27, 2025

(54) SMART DIALING RECOMMENDATION METHOD, NON-TRANSITORY COMPUTER-READABLE MEDIUM, AND MOBILE DEVICE

(71) Applicant: ASUSTeK COMPUTER INC., Taipei (TW)

(72) Inventors: Po-Yuan Shih, Taipei (TW); Cheng-Ming Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 448 days.

(21) Appl. No.: 17/936,927

(22) Filed: Sep. 30, 2022

(65) Prior Publication Data
US 2023/0137400 A1  May 4, 2023

(30) Foreign Application Priority Data
Oct. 28, 2021 (TW) .................. 110140071

(51) Int. Cl.
*H04M 1/2748* (2020.01)
*H04W 4/16* (2009.01)
*H04W 8/18* (2009.01)

(52) U.S. Cl.
CPC ........... *H04M 1/2748* (2020.01); *H04W 4/16* (2013.01); *H04W 8/18* (2013.01)

(58) Field of Classification Search
CPC ........... H04M 1/2748; H04M 1/72451; H04M 1/2746; H04M 2250/60; H04W 4/16; H04W 8/18
See application file for complete search history.

(56) References Cited

U.S. PATENT DOCUMENTS 6,961,559 B1 * 11/2005 Chow ............... H04M 3/42314
                                                              455/414.1
7,103,161 B2    9/2006 Tsuchiyama
(Continued)

FOREIGN PATENT DOCUMENTS

CN       1429044 A     7/2003
CN     102710853 A    10/2012
(Continued)

OTHER PUBLICATIONS

Guerra-Manzanares, Alejandro, Sven Nõmm, and Hayretdin Bahsi. "Time-frame analysis of system calls behavior in machine learning-based mobile malware detection." 2019 International Conference on Cyber Security for Emerging Technologies (CSET). IEEE, 2019. (Year: 2019).*

*Primary Examiner* — Sharad Rampuria
(74) *Attorney, Agent, or Firm* — McClure, Qualey & Rodack, LLP

(57) ABSTRACT

A smart dialing recommendation method, a non-transitory computer-readable medium, and a mobile device are disclosed. The smart dialing recommendation method includes: establishing a database according to a correspondence between a plurality of different time intervals in a past time range and a plurality of communication numbers by using a machine learning algorithm; obtaining a time stamp; and determining whether the time stamp has expired. When it is determined that the time stamp has not expired, according to the correspondence in the database and a current time point, a recommended number corresponding to the current time point is retrieved from the plurality of communication numbers. When it is determined that the time stamp has expired, the machine learning algorithm is performed again to update the plurality of communication numbers.

9 Claims, 4 Drawing Sheets

(56) References Cited

U.S. PATENT DOCUMENTS

| | | | | |
|---|---|---|---|---|
| 8,938,256 B2 * | 1/2015 | Logan | ................ | G08B 13/1427 |
| | | | | 455/457 |
| 2004/0136510 A1 * | 7/2004 | Vander Veen | ........ | H04M 3/533 |
| | | | | 379/88.22 |

FOREIGN PATENT DOCUMENTS

| | | | |
|---|---|---|---|
| CN | 106790917 A | 5/2017 | |
| CN | 112399011 A | 2/2021 | |
| CN | 110225176 B | 3/2021 | |

\* cited by examiner

100

SMART DIALING RECOMMENDATION METHOD, NON-TRANSITORY COMPUTER-READABLE MEDIUM, AND MOBILE DEVICE

CROSS-REFERENCE TO RELATED APPLICATION

This application claims the priority benefit of Taiwan application serial No. 110140071, filed on Oct. 28, 2021. The entirety of the above-mentioned patent application is hereby incorporated by reference herein and made a part of the specification.

BACKGROUND OF THE INVENTION

Field of the Invention

The disclosure relates to a control method for a mobile device, and in particular, to a smart dialing recommendation method for a mobile device.

Description of the Related Art

Conventionally, when intending to make a call, a user generally searches call records for a record intending to be dialed, and makes the call through the record; or searches a contact list for a contact intending to be contacted, and selects a number of the contact to make the call; or directly enters a phone number to make the call. However, with the increasingly frequent usage, the amount of data including call records and contacts also increases. Consequently, the convenience for the user in dialing experience also decreases.

BRIEF SUMMARY OF THE INVENTION

According to the first aspect of the disclosure, a smart dialing recommendation method is provided. The smart dialing recommendation method includes: establishing a database according to a correspondence between a plurality of different time intervals in a past time range and a plurality of communication numbers by using a machine learning algorithm; obtaining a time stamp; and determining whether the time stamp has expired. When it is determined that the time stamp has not expired, according to the correspondence in the database and a current time point, a recommended number corresponding to the current time point is retrieved from the plurality of communication numbers. When it is determined that the time stamp has expired, the machine learning algorithm is performed again to update the plurality of communication numbers.

According to the second aspect of the disclosure, a non-transitory computer-readable medium is provided. The non-transitory computer-readable medium includes computer program instructions. The computer program instructions, when executed by a processor, cause the processor to perform the following steps: accessing a database, and establishing the database according to a correspondence between a plurality of different time intervals in a past time range and a plurality of communication numbers by using a machine learning algorithm; obtaining a time stamp; and determining whether the time stamp has expired. When it is determined that the time stamp has not expired, according to the correspondence in the database and a current time point, a recommended number corresponding to the current time point is retrieved from the plurality of communication numbers. When it is determined that the time stamp has expired, the machine learning algorithm is performed again to update the plurality of communication numbers.

The disclosure further provides a mobile device, including an interface, a memory, and a processor. The memory includes computer program instructions. The processor is coupled to the memory and the interface, and is configured to execute the computer program instructions. The computer program instructions, when executed by the processor, cause the processor to perform the following steps: accessing a database, and establishing the database according to a correspondence between a plurality of different time intervals in a past time range and a plurality of communication numbers by using a machine learning algorithm; obtaining a time stamp from the database; and determining whether the time stamp has expired. When it is determined that the time stamp has not expired, according to the correspondence in the database and a current time point, a recommended number corresponding to the current time point is retrieved from the plurality of communication numbers. When it is determined that the time stamp has expired, the machine learning algorithm is performed again to update the plurality of communication numbers in the database.

BRIEF DESCRIPTION OF THE DRAWINGS

To make the above and other objectives, features, advantages, and embodiments of the disclosure more obvious and comprehensible, descriptions of the accompanying drawings are provided as follows.

DETAILED DESCRIPTION OF THE EMBODIMENTS

The following describes the embodiments in detail with reference to the accompanying drawings. However, the provided embodiments are not used for limiting the scope covered by the disclosure, and descriptions of structure operations are not used for limiting an execution order. Any apparatus generated based on a structure with reassembled elements and achieving an equivalent effect falls within the scope covered by the disclosure. In addition, the drawings are drawn only for the purpose of description, and are not drawn according to original sizes. To facilitate understanding, same components or similar elements in the following description are described by using same symbol.

In this specification, although terms such as "first" and "second" are used for describing different elements in this specification, the terms are only used to distinguish between elements or operations described by using same technical terms.

Figure 1:
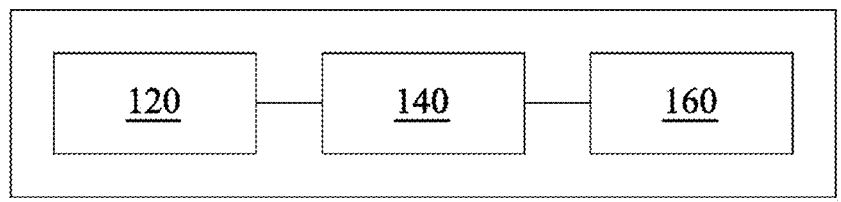
FIG. 1 is a schematic diagram of a mobile device according to an embodiment of the disclosure.

The disclosure provides a smart dialing recommendation method. First, hardware configured to execute the smart dialing recommendation method is described. In an embodiment, the smart dialing recommendation method is applied to a smart dialing application. The application is run in a mobile device (for example, a mobile phone) to perform the smart dialing recommendation method. Referring to FIG. 1, the mobile device 100 includes a memory 120, a processor 140, and an interface 160. The processor 140 is coupled to the memory 120 and the interface 160 and is configured to execute a smart dialing application. The memory 120 is configured to store data (for example, call records of a mobile phone) and execution results of the smart dialing application. The interface 160 is configured to receive an input and display an output (for example, a recommended number calculated by the smart dialing application, which is described in detail later). In an embodiment, the memory 120 is a hard disk, a flash memory, a dynamic memory, or another element with a storage function. The processor 140 is a central processing unit (CPU), a graphics processing unit, an application-specific integrated circuit (ASIC), or another similar operation circuit. In an embodiment, the interface 160 is a touch screen, a display screen with buttons, a display screen with a touchpad, or another similar input/output circuit.

Figure 2:
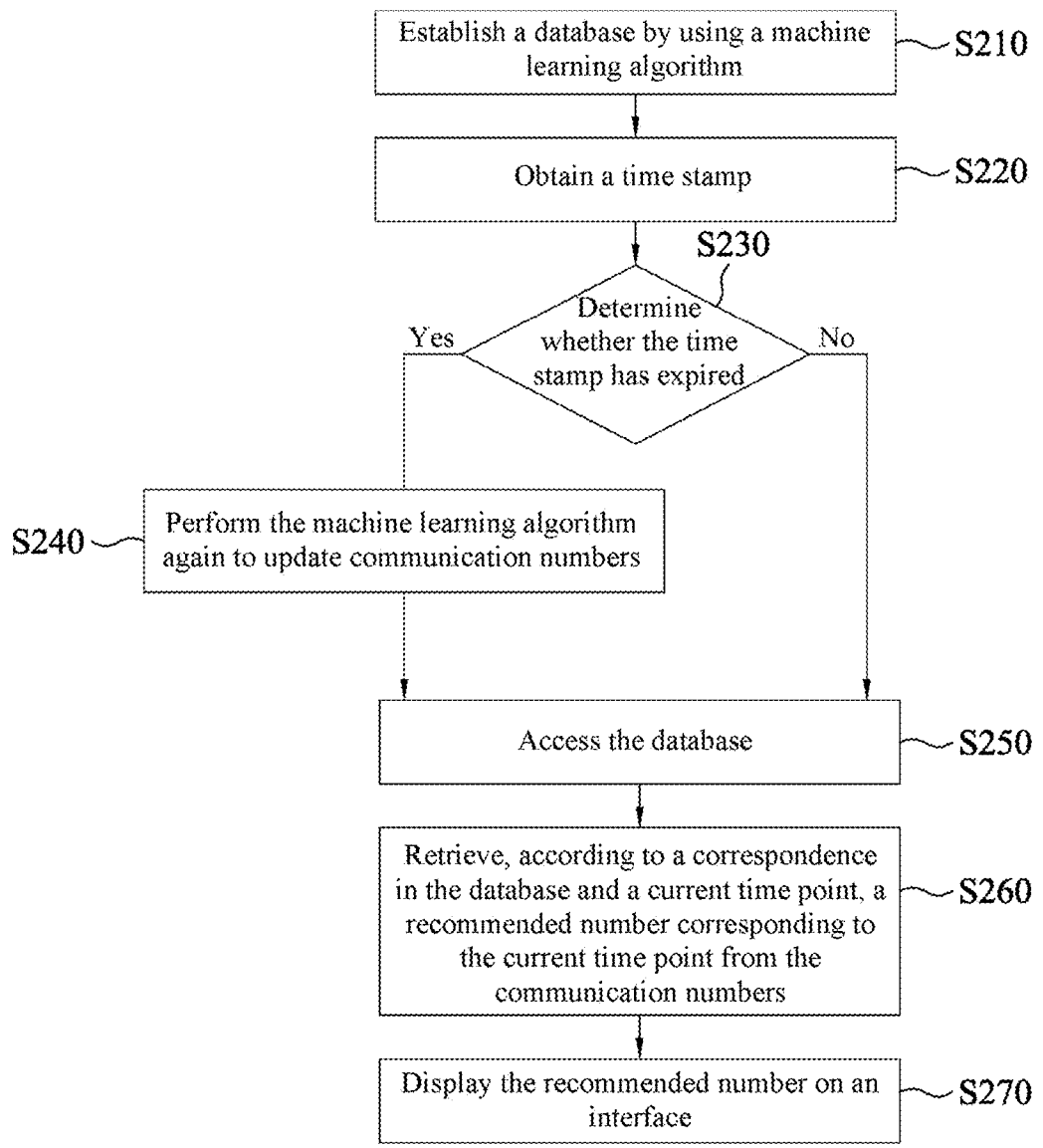
FIG. 2 is a flowchart of a smart dialing recommendation method according to an embodiment of the disclosure.

The smart dialing recommendation method and steps are described in detail below. Referring to FIG. 2, the smart dialing recommendation method 200 includes steps S210, S220, S230, S240, S250, S260, and S270.

In step S210, the processor 140 establishes a database according to a correspondence between a plurality of different time intervals in a past time range and a plurality of communication numbers by using a machine learning algorithm. In other words, the processor 140 performs a machine learning algorithm to obtain a plurality of communication numbers, and then stores the communication numbers in a database. In addition, each communication number corresponds to a specific time interval in each week, and the plurality of communication numbers corresponds to different time intervals in each week (such as 8:00 am to 9:00 am on Monday and 3:00 pm to 4:00 pm on Tuesday) respectively.

Specifically, the processor 140 retrieves call records of a mobile device in a past time range. In an embodiment, the processor retrieves call records starting from past five weeks at most to a current time point. The call records include phone numbers dialed by a user on the mobile device and time points. Each time the user enters a phone number on the mobile device and selects to make a call, a call record is generated, and the call record includes information about the phone number of the call and a call time point, and includes information about a plurality of calls that the user has made in a past time range. It is to be noted that in actual application, call records in a different past time range such as one week, two weeks, one month, or two months are alternatively used.

In an embodiment, the call records are stored in the memory 120 of the mobile device 100, and when the processor 140 executes the smart dialing application, the processor 140 accesses the memory 120 to retrieve call records of the mobile device in a past time range. In an embodiment, the database is established in the memory 120 of the mobile device 100, and in the smart dialing recommendation method 200, the communication numbers are stored in the memory 120 of the mobile device 100. In other words, the database in the memory 120 is established by the processor 140 by using the machine learning algorithm, and includes communication numbers corresponding to each time interval in one week.

In step S220, the processor 140 obtains a time stamp. In an embodiment, before performing the step S220 of obtaining a time stamp, the processor 140 first provides a time stamp. In an embodiment, the time stamp is stored in the database. In an embodiment, the time stamp is set at 0:00 on Monday, and expires at 0:00 on next Monday. In the smart dialing recommendation method 200, through setting, expiration, and resetting of the time stamp, the machine learning algorithm is performed at a specific time point of each week (for example, at 0:00 on each Monday in the foregoing embodiment) to obtain updated recommended numbers. For the machine learning algorithm and the generation of the recommended numbers, description is made later.

In step S230, the processor 140 determines whether the time stamp has expired, where the time stamp expires after one week. In other words, whether one week has passed after the time stamp is set is determined in step S230.

Through the determining in step S230, if the time stamp has expired, in the smart dialing recommendation method 200, the machine learning algorithm is performed again to update the plurality of communication numbers, and the communication numbers are stored in the database. Similarly, each communication number corresponds to a specific time interval in each week, and the plurality of communication numbers corresponds to different time intervals in each week (such as 8:00 am to 9:00 am on Monday and 3:00 pm to 4:00 pm on Tuesday) respectively. For how to define the time interval, description is made in detail later.

In an embodiment, the step S240 of performing the machine learning algorithm again to update the plurality of communication numbers further includes a plurality of steps S241, S242, S243, and S244. Reference is made to a flowchart in FIG. 3.

In step S241, the processor 140 retrieves call records of a mobile device in a specific time interval. In an embodiment, the processor retrieves call records starting from past five weeks at most to a current time point. The call records in the specific time interval include phone numbers dialed by the user on the mobile device and time points. Referring to FIG. 1 again, in an embodiment, the call records in the specific time interval are stored in the memory 120 of the mobile device 100, and when the processor 140 executes the smart dialing application, the processor 140 accesses the memory 120 to retrieve the call records of the mobile device in the specific time interval. In an embodiment, in the smart dialing recommendation method 200, call records of the mobile device in a specific time interval are retrieved at 0:00 on Monday (for example, in an embodiment in which the specific time interval is five weeks, in the smart dialing recommendation method 200, all call records of the mobile device in an interval of five weeks between 0:00 on Monday and 0:00 on Monday are retrieved at 0:00 on Monday).

It is to be noted that exemplary description is made by retrieving the call records of the mobile device in the past five weeks in the foregoing embodiment. In actual application, call records in a different specific time interval such as one week, two weeks, one month, or two months are alternatively used.

In step S242, the processor 140 predicts a plurality of communication numbers in each time interval according to a historical data feature, where each of the plurality of communication numbers corresponds to each of a plurality of different time intervals in one week. In an embodiment, in the smart dialing recommendation method 200, the call records in the specific time interval (for example, in the last five weeks) retrieved in step S241 are first divided into different time intervals by one hour. In other words, if one hour is used as a unit, there are 24 time intervals in one day, and call records in one week (a total of seven days) are divided into 168 time intervals.

How to predict communication numbers in each time interval according to a historical data feature is described below. The processor 140 uses past call records of the user in a specific time interval as historical data in a manner of machine learning, retrieves a historical data feature from the historical data, and trains a corresponding model by using the historical data feature, and further the model predicts a phone number that the user is most likely to perform dialing in each time interval of a next week. In other words, if only call records in a last week are available, in the smart dialing recommendation method 200, a model is trained by using the call records in the last week as historical data, to predict a phone number that the user is likely to perform dialing in each time interval of a second week. If call records in last two weeks are available, the processor 140 trains a model by using the call records in the last two weeks as historical data, to predict a phone number that the user is likely to perform dialing in each time interval of a third week. By analogy, in the smart dialing recommendation method 200, past call records in a specific time interval (such as one week, five weeks, or two months) are considered and used as historical data for training a model, to predict a phone number that the user is likely to perform dialing in each time interval of a next week.

In an embodiment, the historical data feature is a weekly dialing frequency of a specific phone number, a time interval during which a specific phone number is dialed in one week, or the like. By using the historical data feature, the model calculates, for each time interval in one week by using call records in a specific time interval, a probability that the user dials each number. In an embodiment, two numbers with highest probabilities are used as prediction results in the time interval, and the prediction results are stored in the database (for example, the database established in the memory 120).

In other words, in a specific time interval, the user dials different phone numbers in different time intervals. The processor 140 learns a dialing rule of the user by using a machine learning method and historical data to establish a model, to determine which phone numbers are to be recommended to the user in each time interval of a next week. In an embodiment, if the user makes a total of three calls in one week of a specific time interval, which respectively are that the user calls his wife at 8:00 pm on Tuesday to ask whether she is off work; calls a cram school teacher at 5:00 pm on Wednesday to ask whether the class is over; and makes a call at 9:00 am on Saturday to make a reservation, in the smart dialing recommendation method 200, in a next week, the phone number of the wife is recommended to the user at 8:00 pm on Tuesday, the phone number of the cram school teacher is recommended to the user at 5:00 pm on Wednesday, and the phone number for making a reservation is recommended to the user at 9:00 am on Saturday. In other words, the phone number of the wife is a communication number corresponding to a time interval between 8:00 pm and 8:59 pm on Tuesday, the phone number of the cram school teacher is a communication number corresponding to a time interval between 5:00 pm and 5:59 pm on Wednesday, and the phone number for making a reservation is a communication number corresponding to a time interval between 9:00 am and 9:59 am on Saturday.

For how to learn a dialing rule of the user by using historical data to establish a model, to determine which phone number are to be recommended to the user in a time interval, another embodiment is used for description. If on Tuesday of one week in a specific time interval, the user calls A at 8:00 pm, calls B at 8:10 pm, and calls A again at 8:20 pm, where the user separately calls A twice and calls B once in the time interval, and the communication numbers all correspond to the same time interval (that is, a time interval between 8:00 pm and 8:59 pm on Tuesday), in the smart dialing recommendation method 200, a dialing rule of the user is learned by using the historical data to establish a model, and it is calculated that a probability that the user calls A is two-thirds and a probability that the user calls B is one-third in the time interval. In an embodiment, the smart dialing recommendation method 200 is for a case in which two phone numbers with highest dialing probabilities are recommended in a specific time interval. Therefore, in the smart dialing recommendation method 200, the phone numbers of A and B are to be recommended in the foregoing case. In an embodiment, the smart dialing recommendation method 200 is for a case in which one phone number with a highest dialing probability is recommended in a specific time interval. Therefore, in the smart dialing recommendation method 200, the phone number of A is to be recommended to the user at 8:00 pm on next Tuesday in the foregoing case.

In an embodiment, numbers recommended by the processor 140 in each time interval includes at most two phone numbers. In an embodiment, if on Tuesday of one week in a specific time interval, the user calls A at 8:00 pm, calls B at 8:10 pm, calls A again at 8:20 pm, calls B at 8:30 pm again, and calls C at 8:45 pm, where the user separately calls A twice, calls B twice, and calls C once in the time interval, and the five call records all correspond to the same time interval (that is, a time interval between 8:00 pm and 8:59 pm on Tuesday), the processor 140 learns a dialing rule of the user by using the historical data to obtain a model, and determines to recommend the phone numbers of A and B (two in total) to the user at 8:00 pm on next Tuesday.

In step S243, the processor 140 stores the plurality of communication numbers in the database in the memory 120. Referring to FIG. 1 again, in an embodiment, the database is established in the memory 120 of the mobile device 100, and in the smart dialing recommendation method 200, the communication numbers are stored in the memory 120 of the mobile device 100.

In step S244, the processor 140 resets the time stamp, and performs the machine learning algorithm again after one week to obtain communication numbers. As described above, the time stamp expires after one week. Therefore, if the time stamp is reset in step S244, the smart dialing recommendation method 200 is performed again after one week. In step S230 in the embodiment in FIG. 2, it is determined that the time stamp has expired, and by using steps S241, S242, and S243 in the embodiment in FIG. 3, the communication numbers are updated according to the call records in the specific time interval.

Figure 3:
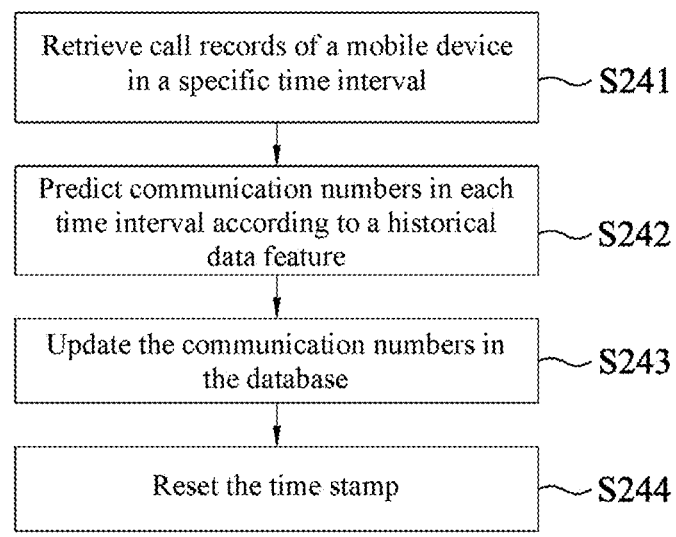
FIG. 3 is a flowchart of performing a machine learning algorithm to obtain a plurality of communication numbers according to an embodiment of the disclosure.

Referring to both FIG. 2 and FIG. 3, after step S244 is completed (that is, step S240 is completed), step S250 continues to be performed in the smart dialing recommendation method 200. In step S250, the processor 140 accesses the database in the memory 120. As described above, the database in the memory 120 is established by the processor 140 by using the machine learning algorithm, and includes communication numbers corresponding to each time interval in one week.

In an embodiment, when it is determined in step S230 that the time stamp has not expired, the processor 140 directly accesses the database to retrieve a recommended number. In other words, as shown in FIG. 2, if the determining in step S230 is "No", step S250 is directly performed without performing step S240 or steps S241, S242, S243, and S244 in the embodiment in FIG. 3. In an embodiment, the time stamp is reset at 0:00 am on each Monday. Assuming that the user performs the smart dialing recommendation method 200 at any time point on Tuesday, it is determined in step S230 that the time stamp has not expired and step S250 is performed to directly access the database. In this case, the communication numbers in the database are recommended numbers obtained by performing the machine algorithm by the processor 140 at 0:00 on Monday.

In step S260, the processor 140 retrieves, according to the correspondence in the database and a current time point, a recommended number corresponding to the current time point from the plurality of communication numbers. As described above, the plurality of communication numbers is numbers predicted after the learning is completed in the foregoing manner of machine learning, and the numbers correspond to a plurality of different time intervals in one week. Therefore, in step S260, the processor 140 first retrieves a current time point, determines a time interval to which the current time point belongs, then searches the communication numbers stored in the database for a communication number corresponding to the time interval, and uses the communication number as a recommended number.

Figure 4:
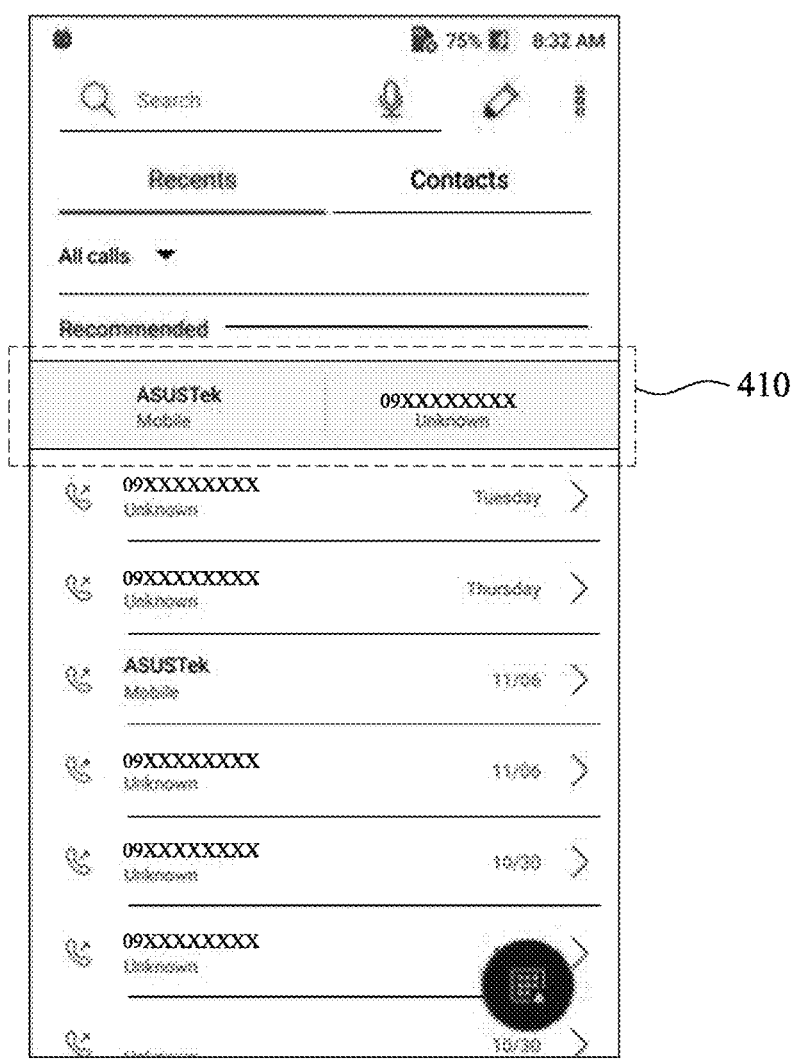
FIG. 4 is a schematic diagram of a smart dialing recommendation application interface according to an embodiment of the disclosure.

In step S270, in the smart dialing recommendation method 200, the recommended number is displayed on an interface of the mobile device (for example, the interface 160 of the mobile device 100 in the embodiment in FIG. 1). In an embodiment, the interface of the mobile device executing a smart dialing recommendation application includes a recommended number field. FIG. 4 is a schematic diagram of a smart dialing recommendation application interface 400 according to an embodiment of the disclosure. The smart dialing recommendation application interface 400 displays a screen of a mobile device executing a smart dialing recommendation application, and includes a recommended number field 410. The recommended number field 410 includes information about specific phone numbers and names of contacts. As shown in FIG. 4, in an embodiment, after the smart dialing recommendation application is executed, the embedded recommended number field 410 is displayed in a phone dialing application inherent to the mobile device. In an embodiment, in the smart dialing recommendation method 200, at most two recommended numbers corresponding to the current time are displayed on the interface.

In an embodiment, when two communication numbers in the database correspond to the current time point, the two communication numbers are both displayed on the interface of the mobile device. In other words, if the smart dialing recommendation method 200 has been performed for more than several weeks, a plurality of communication numbers in the database corresponds to the same hour in one week. In an embodiment, if the smart dialing recommendation method 200 has been performed for five weeks, and in a specific time interval in the five weeks (for example, a time interval between 8:00 pm and 8:59 pm on Tuesday in each of the five weeks), the user calls A in the first week, calls B in the second week, calls C in the third week, calls A in the fourth week, and calls B in the fifth week, in the smart dialing recommendation method 200, communication numbers corresponding to the time interval between 8:00 pm and 8:59 pm on Tuesday are predicted by using the machine learning algorithm in steps S242 and S243, and include phone numbers of A and B, which have been stored in the database. Therefore, in the time interval of the sixth week, in the smart dialing recommendation method 200, the phone numbers of A and B are displayed on the interface of the mobile device of the user.

In an embodiment, the machine learning algorithm is used to predict, according to call records in several weeks, a probability that the user dials a specific phone number in a specific time interval in a next week. As in the case in the foregoing embodiments, the machine learning algorithm is used to calculate that a probability that the user calls A in the time interval in the fifth week is one-half, and a probability of calling B or C is one-quarter. Further, when the smart dialing recommendation method 200 has been performed for several weeks, and call record data increases, in the smart dialing recommendation method 200, a more complete dialing habit and pattern of the user are obtained, to establish a personalized smart dialing recommendation model.

In an embodiment, in the smart dialing recommendation method 200, when the current time point switches to another time interval, the database is automatically accessed and the recommended number corresponding to the current time point is retrieved. In other words, assuming that one hour in one week is used as a time interval, in the smart dialing recommendation method 200, a recommended number is updated every hour according to the database. When the user executes the smart dialing recommendation application on the mobile device, the updated recommended number is displayed on the interface. In an embodiment, when the current time point is 9:00 am on Wednesday, in the smart dialing recommendation method 200, the database is automatically searched for a recommended number corresponding to the time interval, and when the current time point switches to 10:00 am on Wednesday, in the smart dialing recommendation method 200, the database is automatically searched to update the recommended number.

In an embodiment, when the recommended number corresponding to the current time point is displayed on the interface in step S270, if the user does click the recommended number displayed on the interface to perform dialing, in an embodiment, the recommended number selected this time continues to be accumulated for a call frequency, and when a recommended list in a next week is subsequently recalculated and updated according to the foregoing machine learning algorithm, the same number with a relatively high probability continues to be recommended because a relatively large dialing quantity has been accumulated by the number in the same time interval.

In another embodiment, when the recommended number is selected, in the machine learning algorithm in the smart dialing recommendation method 200, a weight of the number is further increased when the number is recommended later. In other words, if the user selects the phone number recommended in the smart dialing recommendation method 200, in the smart dialing recommendation method 200, this case is recorded, and a weight of recommending the phone number in the time interval is increased when the time stamp expires and the recommended number is obtained by using the machine learning algorithm.

In an embodiment, when the recommended number corresponding to the current time point is displayed on the interface in step S270, if the user does not click the recommended number displayed on the interface to perform dialing, in the smart dialing recommendation method 200, the machine learning algorithm is adjusted and a weight of the recommended number is reduced when a number is recommended later. In other words, if the user does not select the phone number recommended in the smart dialing recommendation method 200, in the smart dialing recommendation method 200, this case is recorded, and a weight of recommending the phone number in the time interval is reduced when the time stamp expires and the recommended number is obtained by using the machine learning algorithm.

In an embodiment, if no communication number in the database corresponds to the current time point, a communication number with a highest call frequency (or a maximum quantity of calls) in one week is displayed on the interface as a recommended number. In other words, if there is no communication number in the database for a time interval in one week (that is, the user does not make a call in a specific time interval according to past call records of the user), when the user executes the smart dialing application on the mobile device in the time interval, a communication number with a maximum quantity of calls made by the user in a last week is displayed on the interface as a recommended number.

Another embodiment of the disclosure provides a non-transitory computer-readable medium. The non-transitory computer-readable medium is configured to store computer program instructions. In an embodiment, the non-transitory computer-readable medium is the memory 120. When run by the processor 140, the computer program instructions cause the processor 140 to perform operations of the smart dialing recommendation method 200 in the foregoing embodiments.

In summary, in the smart dialing recommendation method in the disclosure, call records of the user are analyzed by using a machine learning algorithm, to predict a phone number that the user is to dial in a specific time interval, and the phone number is recommended to the user, so that the user executes an application on a mobile device to view the recommended number. In addition, by performing the smart dialing recommendation method for several weeks, a personalized model that meets a dialing habit of the user is established by using a large quantity of call records.

Although the disclosure is disclosed above by using the implementations, the implementations are not intended to limit the disclosure. Any person skilled in the art makes various variations and modifications without departing from the spirit and scope of the disclosure. Therefore, the protection scope of the disclosure is defined by the appended claims.

What is claimed is:

1. A smart dialing recommendation method, comprising:
    establishing a database according to a correspondence between a plurality of different time intervals in a past time range and a plurality of communication numbers by using a machine learning algorithm;
    obtaining a time stamp; and
    determining whether the time stamp has expired,
    wherein when it is determined that the time stamp has not expired, according to the correspondence in the database and a current time point,
    a recommended number corresponding to the current time point is retrieved from the plurality of communication numbers; and
    when it is determined that the time stamp has expired, the machine learning algorithm is performed again to update the plurality of communication numbers by:
        retrieving call records of a mobile device in a specific time interval, wherein the call records in the specific time interval comprise
        a plurality of phone numbers dialed by using the mobile device in a specific time interval and a plurality of dialing time points;
        predicting communication numbers in each time interval according to a historical data feature;
        updating the plurality of communication numbers in the database; and
        resetting the time stamp.

2. The smart dialing recommendation method according to claim 1, further comprising:
    displaying the recommended number on an interface of a mobile device.

3. The smart dialing recommendation method according to claim 2, further comprising:
    if a user dials the recommended number displayed on the interface, performing the machine learning algorithm to increase a weight of the recommended number.

4. The smart dialing recommendation method according to claim 2, further comprising:
    if a user does not dial the recommended number displayed on the interface, adjusting the machine learning algorithm to reduce a weight of the recommended number.

5. The smart dialing recommendation method according to claim 1, wherein when at least two of the plurality of communication numbers in the database all correspond to the current time point, displaying all the at least two of the plurality of communication numbers on an interface of a mobile device.

6. The smart dialing recommendation method according to claim 1, further comprising:
    when the current time point switches to another time interval, automatically accessing the database and retrieving the recommended number corresponding to the current time point.

7. The smart dialing recommendation method according to claim 1, further comprising:
    if no communication number in the database corresponds to the current time point, displaying a communication number with a highest call frequency in a specific time interval on an interface.

8. A non-transitory computer-readable medium, comprising computer program instructions, wherein the computer program instructions, when executed by a processor, cause the processor to perform the following steps:
    accessing a database, and
    establishing the database according to a correspondence between a plurality of different time intervals in a past time range and a plurality of communication numbers by using a machine learning algorithm;
    obtaining a time stamp; and
    determining whether the time stamp has expired,
    wherein when it is determined that the time stamp has not expired, according to the correspondence in the database and a current time point,
    a recommended number corresponding to the current time point is retrieved from the plurality of communication numbers; and
    when it is determined that the time stamp has expired, the machine learning algorithm is performed again to update the plurality of communication numbers by:
        retrieving call records of a mobile device in a specific time interval, wherein the call records in the specific time interval comprise
        a plurality of phone numbers dialed by using the mobile device in a specific time interval and a plurality of dialing time points;
        predicting communication numbers in each time interval according to a historical data feature;
        updating the plurality of communication numbers in the database; and
        resetting the time stamp.

9. A mobile device, comprising:
an interface;
a memory, comprising computer program instructions; and
a processor, coupled to the memory and the interface, and configured to execute the computer program instructions,
wherein the computer program instructions, when executed by the processor, cause the processor to perform the following steps:
accessing a database from the memory, and
establishing the database according to a correspondence between a plurality of different time intervals in a past time range and a plurality of communication numbers by using a machine learning algorithm;
obtaining a time stamp from the database; and
determining whether the time stamp has expired,
wherein when it is determined that the time stamp has not expired, according to the correspondence in the database and a current time point, a recommended number corresponding to the current time point is retrieved from the plurality of communication numbers; and
when it is determined that the time stamp has expired, the machine learning algorithm is performed again to update the plurality of communication numbers in the database by:
retrieving call records of a mobile device in a specific time interval, wherein the call records in the specific time interval comprise
a plurality of phone numbers dialed by using the mobile device in a specific time interval and a plurality of dialing time points;
predicting communication numbers in each time interval according to a historical data feature;
updating the plurality of communication numbers in the database; and
resetting the time stamp.

* * * * *